US 9,336,827 B2

(12) United States Patent
Helm

(10) Patent No.: US 9,336,827 B2
(45) Date of Patent: May 10, 2016

(54) SYSTEMS AND METHODS FOR BROWSING A MOBILE DEVICE WITH AN IN-VEHICLE USER INTERFACE

(75) Inventor: Sean L. Helm, Saline, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 241 days.

(21) Appl. No.: 13/444,404

(22) Filed: Apr. 11, 2012

(65) Prior Publication Data

US 2013/0275871 A1  Oct. 17, 2013

(51) Int. Cl.
| G06F 3/048 | (2013.01) |
| G11B 27/34 | (2006.01) |
| G11B 27/10 | (2006.01) |
| G11B 27/11 | (2006.01) |
| H04M 1/60 | (2006.01) |
| H04M 1/725 | (2006.01) |

(52) U.S. Cl.
CPC .............. *G11B 27/105* (2013.01); *G11B 27/11* (2013.01); *G11B 27/34* (2013.01); *H04M 1/6075* (2013.01); *H04M 1/72558* (2013.01)

(58) Field of Classification Search
CPC ................................. G01C 21/36; G06F 3/048
USPC ........................................................ 715/716
See application file for complete search history.

(56) References Cited

U.S. PATENT DOCUMENTS

| 7,870,142 | B2 | 1/2011 | Michmerhuizen et al. |
| 8,099,334 | B1 | 1/2012 | Stockwell |
| 2004/0044725 | A1* | 3/2004 | Bell et al. .................... 709/203 |
| 2004/0093155 | A1 | 5/2004 | Simonds et al. |
| 2006/0040609 | A1* | 2/2006 | Petschke et al. ............. 455/3.02 |
| 2008/0256627 | A1* | 10/2008 | Kokkinen .............. G06Q 20/04 726/21 |
| 2010/0004853 | A1 | 1/2010 | Siereveld et al. |
| 2010/0049768 | A1* | 2/2010 | Robert ......................... 707/749 |
| 2010/0211708 | A1 | 8/2010 | Rohaly et al. |
| 2010/0220250 | A1* | 9/2010 | Vanderwall et al. .......... 348/837 |
| 2011/0081859 | A1 | 4/2011 | Chung |
| 2011/0105097 | A1 | 5/2011 | Tadayon et al. |
| 2011/0110530 | A1 | 5/2011 | Kimura |
| 2011/0131180 | A1* | 6/2011 | Tuli et al. ...................... 707/610 |
| 2011/0257973 | A1* | 10/2011 | Chutorash et al. ........... 704/235 |
| 2011/0289139 | A1* | 11/2011 | McIntosh ............. H04N 21/252 709/203 |

FOREIGN PATENT DOCUMENTS

EP        1829339 B1    11/2011

OTHER PUBLICATIONS

PCT International Search Report and the Written Opinion of the International Searching Authority dated Mar. 28, 2013, 37 pages.

* cited by examiner

*Primary Examiner* — Jennifer To
*Assistant Examiner* — Xuyang Xia
(74) *Attorney, Agent, or Firm* — Dinsmore & Shohl LLP

(57) ABSTRACT

Systems and methods for browsing a mobile device are provided. Some embodiments may include determining a location of each of a plurality of media files on the mobile device. The plurality of media files may be organized according to a predetermined configuration and may include at least two identical media files at different locations in the predetermined configuration. Similarly, some embodiments may include receiving a request for a requested media file of the plurality of media files at the vehicle computing device and determining which of the at least two identical media files is more accessible. Still some embodiments may include navigating the mobile device to one of the at least two identical media files that is more accessible and play the requested media file through a vehicle audio system.

20 Claims, 8 Drawing Sheets

SYSTEMS AND METHODS FOR BROWSING A MOBILE DEVICE WITH AN IN-VEHICLE USER INTERFACE

TECHNICAL FIELD

Embodiments described herein generally relate to systems and methods for browsing a mobile device with an in-vehicle user interface and, more specifically, to a vehicle computing device indexing a mobile device to provide navigation and playback functionality of the mobile device in a vehicle.

BACKGROUND

Oftentimes vehicle users have access to media files that are stored on a mobile device, such as a laptop computer, mobile phone, etc. However, when the vehicle user is operating the vehicle, the mobile device may be stowed away in a pocket, purse, briefcase, or is otherwise inaccessible. Further, as many U.S. States are now enacting laws that prohibit the operation of mobile devices while operating a vehicle, operation of the mobile device may be undesirable. As a consequence, vehicle users often desire to only communicate with the vehicle instead of the mobile device.

SUMMARY

Systems and methods for browsing a mobile device with an in-vehicle user interface are provided. Some embodiments include determining a location of each of a plurality of media files on the mobile device. The plurality of media files may be organized according to a predetermined configuration and may include at least two identical media files at different locations in the predetermined configuration. Similarly, some embodiments may include receiving a request for a requested media file of the plurality of media files at the vehicle computing device and determining which of the at least two identical media files is more accessible. Still some embodiments may include navigating the mobile device to one of the at least two identical media files that is more accessible and play the requested media file through a vehicle audio system.

In another embodiment, a method for browsing a mobile device with an in-vehicle user interface includes linking a vehicle computing device with the mobile device, where the mobile device stores a plurality of media files that are organized according to a predetermined configuration. Some embodiments include determining, by the vehicle computing device, a location of each of the plurality of media files with regard to the predetermined configuration, receiving a first request for a requested media file of the plurality of media files at the vehicle computing device, and determining a location of the requested media file in the predetermined configuration. Still some embodiments include sending a control signal to navigate the mobile device to the requested media file, sending a second request to play the requested media file, and receiving the requested media file for playback.

Some embodiments of a system include a memory component that stores logic that, when executed by the system, causes the system to identify the mobile device in proximity of a vehicle computing device, where the mobile device stores a plurality of media files that are organized according to a predetermined configuration. In some embodiments, the logic causes the system to determine a location of each of the plurality of media files with regard to the predetermined configuration, provide an in-vehicle user interface that functionally mirrors an interface of the mobile device and provides the location of each of the plurality of media files with regard to the predetermined configuration, and receive a first request for a requested media file of the plurality of media files at the vehicle computing device. In still some embodiments, the logic causes the system to determine a location of the requested media file in the predetermined configuration, send a control signal to navigate the mobile device to the requested media file, and send a second request to play the requested media file.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for browsing a mobile device with an in-vehicle user interface. Some embodiments may provide portable audio devices in the vehicle that are controlled over a wireless protocol and/or utilizing existing microphone and audio video remote control profile (AVRCP). The control may be through an electronic program guide (EPG) in the vehicle and/or via voice recognition of a voice command to control audio media available through the portable audio devices. The mobile device may be configured to provide a virtual file system of media files, such as audio files and video files. A unique identifier address may be established for each file on the mobile device. Thus, embodiments disclosed herein may index and/or save all the unique identifier addresses on the virtual file system of the target device on the controller. Once this is complete, the location of each file on the mobile device is stored by the vehicle computing device. A user can then utilize the vehicle AVRCP or other interface to control the mobile device.

Figure 1:
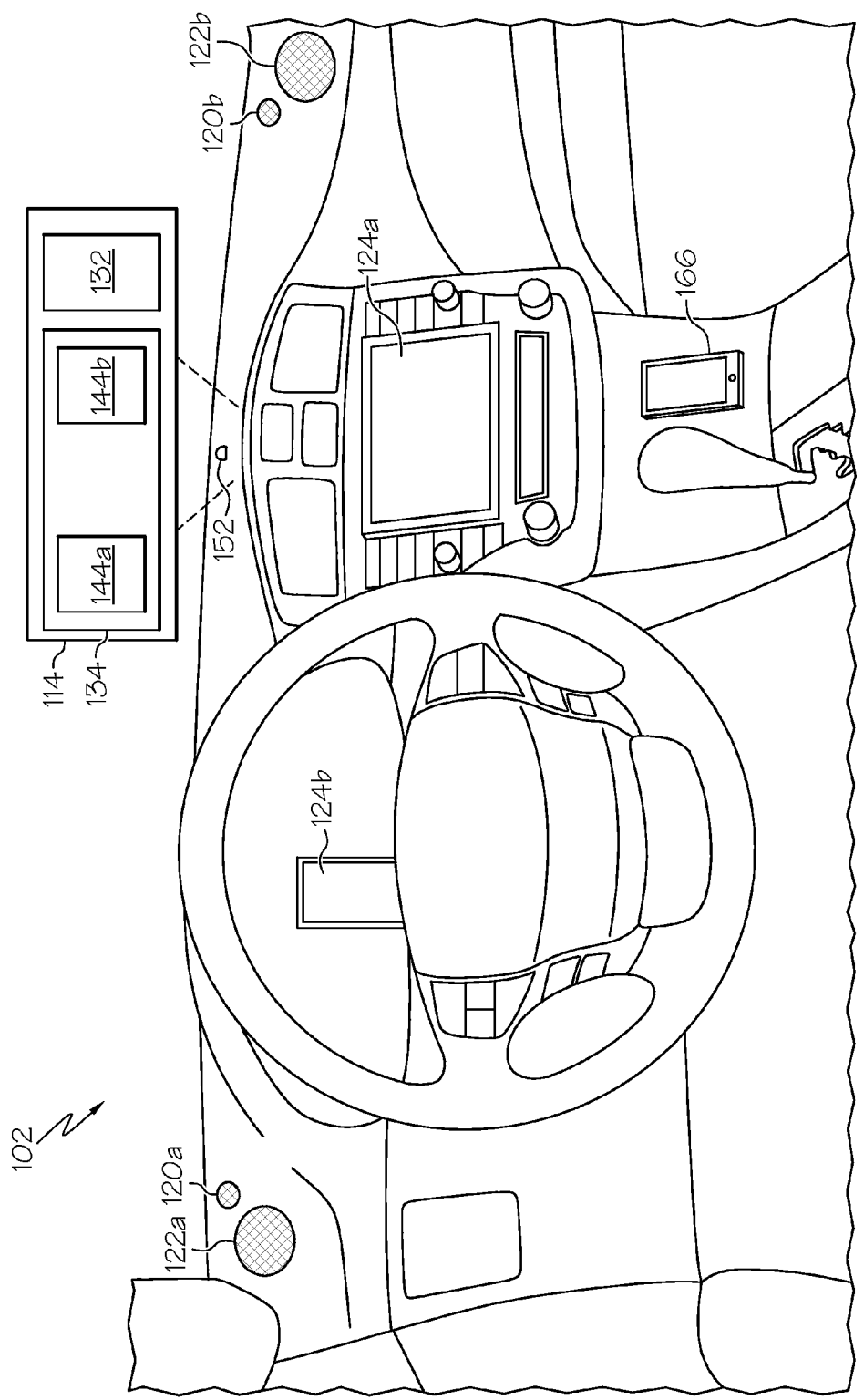
FIG. 1 schematically depicts a vehicle interior with a mobile device located therein, according to embodiments disclosed herein.

Referring now to the drawings, FIG. 1 schematically depicts a vehicle interior with a mobile device 166 located therein, according to embodiments disclosed herein. As illustrated, the vehicle 102 may include a console display 124a and a dash display 124b (referred to independently and/or collectively herein as "display device 124"). The console display 124a may be configured to provide one or more user interfaces and may be configured as a touch screen and/or include other features for receiving user input. The dash display 124b may similarly be configured to provide one or more interfaces, but often the data provided in the dash display 124b is a subset of the data provided by the console display 124a. Regardless, at least a portion of the user interfaces depicted and described herein may be provided on either or both the console display 124a and the dash display 124b.

Also included in the vehicle 102 is a content playback device 110, which may include a tape player, a compact disc player, a digital video disc player, a media file player, a radio signal receiver, a television signal receiver, an internet receiver, a navigation receiver, etc. The content playback device 110 may be operated via a touch screen of the display device 124, and/or one or more other inputs, such as on the dashboard and/or a steering wheel 148 of the vehicle 102. Also coupled to the content playback device 110 and/or display device 124 are one or more microphones 120a, 120b and one or more speakers 122a, 122b. The one or more microphones 120a, 120b may be configured for receiving user voice commands and/or other inputs. Similarly, the speakers 122a, 122b may be utilized for providing audio content from the content playback device 110 to the user. The content playback device 110, microphones 120, speakers 122, and/or related components may represent a vehicle audio system.

Figure 8:
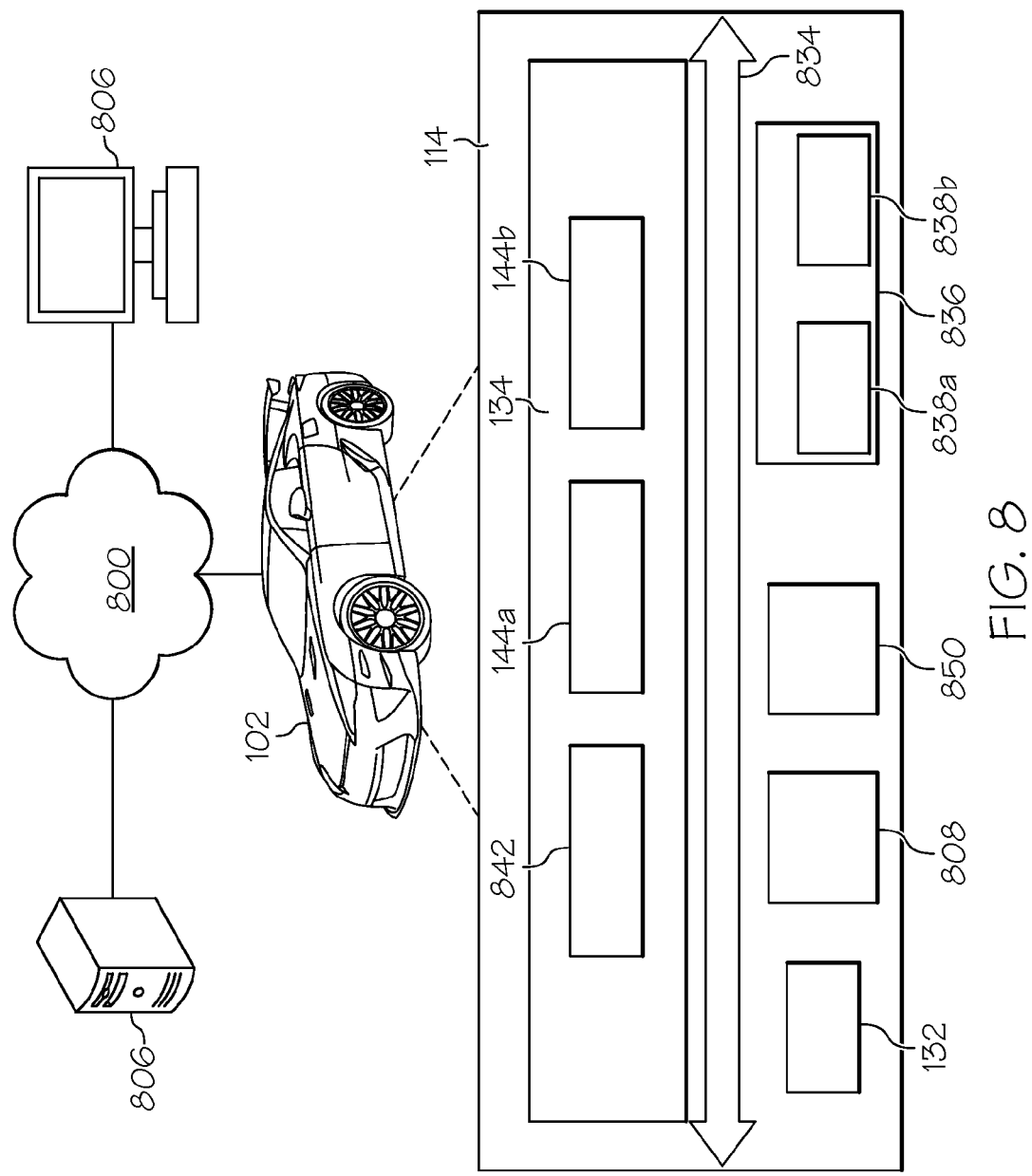
FIG. 8 depicts a network environment for vehicle browsing of a mobile device, according to embodiments disclosed herein.

Also included in the vehicle 102 is a vehicle computing device 114. The vehicle computing device 114 may be configured with a processor 132 and a memory component 134, which may store indexing logic 144a and communications logic 144b. The indexing logic 144a and the communications logic 144b may each include a plurality of different pieces of logic, each of which may be embodied as a computer program, firmware, and/or hardware, as an example. The indexing logic 144a may be configured to cause the vehicle computing device 114 to index content from the mobile device 166, as described below. Similarly, the communications logic 144b may be configured to cause the vehicle computing device 114 to facilitate communication with the mobile device 166. Additional components of the vehicle 102 are depicted in FIG. 8 and described in more detail below.

The vehicle 102 may also include a communication transceiver 152. The communication transceiver 152 is configured to facilitate communication between a mobile device 166 and the vehicle computing device 114. Depending on the particular embodiment, the communication transceiver 152 may be configured for a near-field wireless communication and/or other wired or wireless communication protocol for communicating with the mobile device 166. The mobile device 166 may include any communications device configured for storage of media files. The mobile device 166 may include a mobile telephone, a tablet, a media file player, and/or other similar mobile device that is not permanently connected to the vehicle 102 and/or may be utilized for functionality outside of the vehicle 102. Thus, while the mobile device 166 is depicted as residing on the dash of the vehicle 102, this is merely an example, as the mobile device 166 need only be in communication with the vehicle 102 via a near field communication, wide area communication, and/or other communication.

Figure 2:
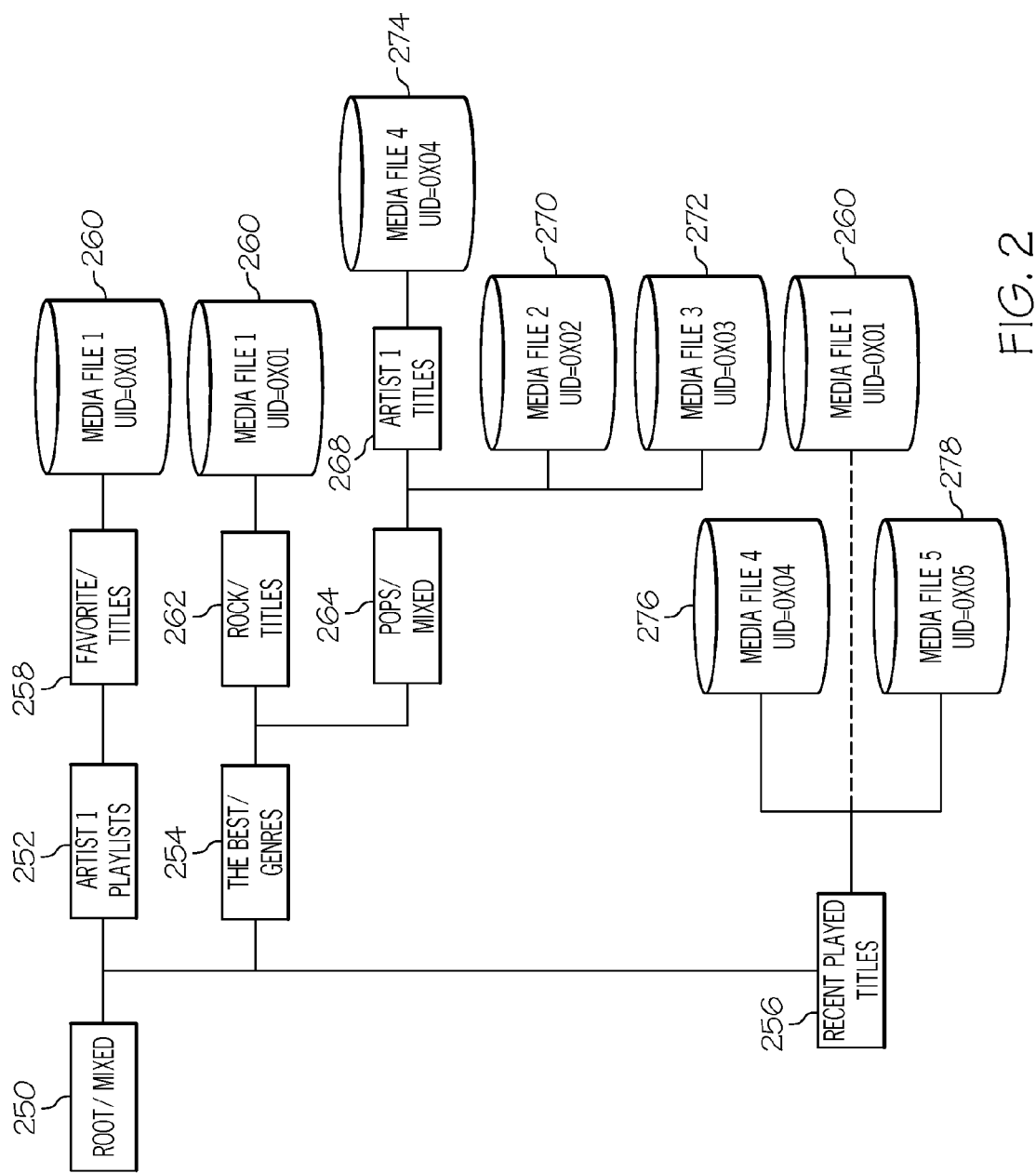
FIG. 2 depicts a media hierarchy, as may be stored in a mobile device, according to embodiments disclosed herein.

FIG. 2 depicts a media hierarchy, as may be stored in a mobile device 166, according to embodiments disclosed herein. As illustrated, the mobile device 166 may store media files and/or folders that are organized according to a hierarchy. Each of the files and/or folders may be assigned a unique identifier. The unique identifier may be configured as any numeric, alphabetic and/or alphanumeric sequence that uniquely identifies a media file and/or folder. Accordingly, upon detecting the mobile device 166, the vehicle computing device 114 may determine a device type for the mobile device 166. This determination may be made via a pairing of the mobile device 166 with the vehicle computing device 114 and/or via user input. Regardless, with the device type determined, the vehicle computing device 114 may recognize the process and/or commands for controlling the mobile device 166. Additionally, the vehicle computing device 114 may interact with the mobile device 166 to determine the location of the media files.

Accordingly, the vehicle computing device 114 may determine a unique identifier for each of the media files and/or folders on the mobile device 166. Depending on the particular embodiment, the mobile device 166 may already provide unique identifiers for the media files and/or folders and the vehicle computing device 114 merely retrieves those unique identifiers from the mobile device 166. In some embodiments however, the vehicle computing device 114 may assign unique identifiers to the media files and/or folders, based on the process for navigating to the media file 426. The vehicle computing device 114 may organize this information in a lookup table or other data structure for easily accessing and editing the data. The data structure may include the unique identifier and data related to navigating the mobile device 166 to the data file. Other information, such as phonetic identifiers for voice control, may also be included.

In the example of FIG. 2, the mobile device 166 may first provide a root folder 250. The root folder 250 may lead to one or more first tier folders, such as an "artist 1 playlists" folder 252, a "the best/genres" folder 254, and a "recent played titles folder" 256. From the artist 1 playlists folder 252, a second tier folder, such as a "favorite/titles" folder may be provided, which may include a first media file 260. The first media file 260 may provide a song, movie, and/or other content that may be displayed by the mobile device 166. The first media file 260 may be linked with a unique identifier, such as 0x01. The unique identifier may take any form and may be utilized by the vehicle computing device 114 for locating the first media file 260. As an example, the vehicle computing device 114 may determine the process for navigating the mobile device 166 to locate the first media file 260. This process may be stored and linked with the unique identifier such that the vehicle computing device 114 may easily retrieve the first media file 260.

Similarly, in the best/genres folder 254, third tier folders such as a "rock/titles" folder 262 and a "pops/mixed" folder 264 may be provided. The rock/titles folder 262 may include the first media file 260. As illustrated, at least two identical media files may be detected and located at different area of the hierarchy. Consequently, the vehicle computing device 114 may recognize that the same file may be accessed at a plurality of locations. In some embodiments, the vehicle computing device 114 may utilize the entire hierarchy of the mobile device 166 for user navigation (e.g., provide links to both copies), but utilize the most efficient navigation path to retrieve the content. Thus, the vehicle computing device 114 may provide an in-vehicle user interface that substantially mirrors the hierarchy and at least one mobile user interface provided by the mobile device 166 and depicted in FIG. 2. However, in such embodiments, the vehicle computing device 114 may actually access media files, based on a determination of which of the identical media files is the more accessible media file. Thus, retrieval of the requested media file may be more efficient.

As discussed with regard to FIG. 3 below, the organization of the mobile device 166 may be duplicated and provided on the display device 124. This allows a user to navigate the vehicle computing device 114 as if the user is operating the mobile device 166. Thus in some embodiments, each user input to the vehicle computing device 114 may result in a communication between the vehicle computing device 114 and the mobile device 166. However, depending on the embodiment, the vehicle computing device 114 will communicate with the mobile device 166 only when the user actually selects a media file to play. Once this occurs, the vehicle computing device 114 may mimic the commands to navigate the mobile device 166 as the user would navigate the mobile device 166 to retrieve the media file. In some embodiments however, the vehicle computing device 114 may simply identify and utilize the most efficient route to locate the media file. In still some embodiments, the vehicle computing device 114 may navigate the mobile device 166, as the user is navigating the vehicle computing device 114.

Referring again to FIG. 2, within the pops/mixed folder 264, a fourth tier folder, such as an artist 1 titles folder 268 may be provided, as well as a second media file 270, and a third media file 272. Within the artist 1 titles folder 268, a fourth media file 274 may be provided. Within the recent played titles folder 256 resides a fourth media file 276, the fifth media file 278, and the first media file 260.

It should be understood that the vehicle computing device 114 may additionally link the unique identifier and the navigation process with voice commands for the user. As an example, the vehicle computing device 114 may utilize voice recognition techniques to determine the phonetic properties of the media files. These phonetic properties may then be linked with the unique identifier, such that if the user vocally requests a media file and/or folder, the vehicle computing device 114 can navigate the mobile device 166, as described above.

Figure 3:
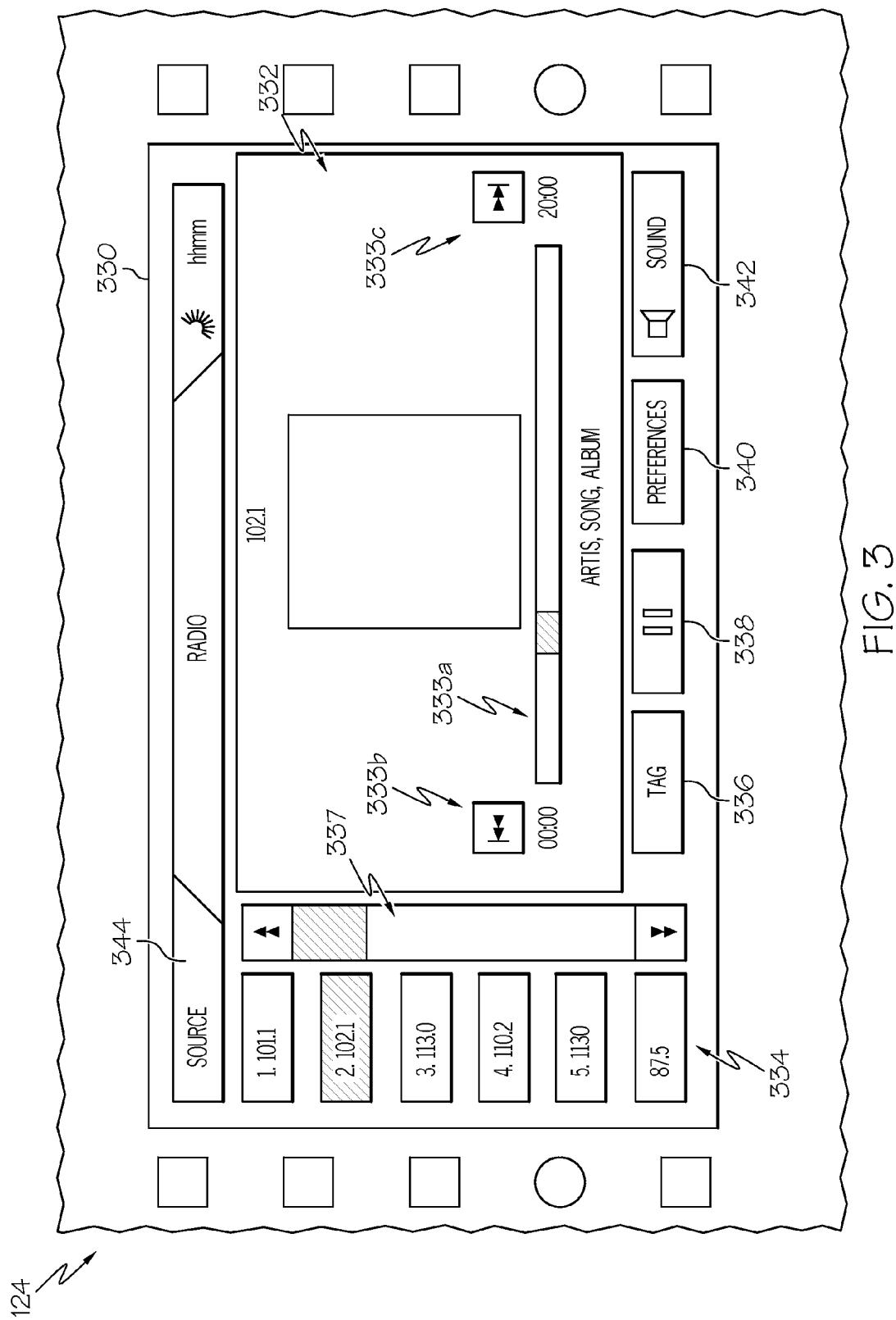
FIG. 3 depicts an in-vehicle user interface for providing audio options to a user of the vehicle, according to embodiments disclosed herein.

FIG. 3 depicts an in-vehicle user interface 330 for providing audio options to a user of the vehicle 102, according to embodiments disclosed herein. As illustrated, the in-vehicle user interface 330 may be provided on the display device 124 of the vehicle 102. The in-vehicle user interface 330 includes a currently playing section 332 for providing the media that is currently playing in the vehicle 102. The currently playing section 332 may include a progress option 333a, reverse option 333b, and a forward option 333c. The progress option 333 may be utilized for informing the user of the progress of the currently playing media and/or manually selecting a time on the currently playing media to play. The reverse option 333b may be utilized for rewinding or restarting the currently playing media. Similarly, the forward option 333c may be utilized for fast forwarding or skipping the currently playing media.

Also included is a channel section 334 for selecting different channels. The channel section 334 may include a plurality of channels from which the user can select. As indicated in the in-vehicle user interface 330, channel 2 (102.1) has been selected. Additional channels may be selected by a user selection of the scroll bar 337.

The in-vehicle user interface 330 may also include a tag option 336, a pause option 338, a preferences option 340, and a sound option 342. In response to selection of the tag option 336, the currently playing content may be tagged for later playback. This may include identifying that the currently playing content is a preferred piece of content such that future determinations of channels and content may be more easily made.

Similarly, in response to the pause option 338, the currently playing content may be paused and buffered for resuming at a future time. As an example, if the currently playing content is received from a radio signal, the vehicle computing device 114 may begin recording the received signal. Additionally, the vehicle computing device 114 may pause playback of the currently playing content. When the pause option 338 is selected again, the vehicle computing device 114 may access the recorded signal to resume playback.

In response to selection of the preferences option 340, additional options may be provided, such as user settings, display setting, etc. Similarly, in response to selection of the sound option 342, one or more sound related settings may be provided. The sound settings may include volume equalizer settings, bass settings, treble settings, balance settings, etc. Other sound related settings may also be provided.

Specifically, the vehicle 102 may receive a media signal, such as from the mobile device 166. The media signal may include a content portion and an auxiliary information display portion. The content portion may include the audio and/or video that is played in the vehicle 102. The auxiliary information display portion may provide data related to the content that is being received, such as title, artist name, album title, etc. Accordingly, the content portion may be provided for display, such as through the speaker 122 (FIG. 1), while the auxiliary information display portion may be provided via the display device 124 (also FIG. 1), as depicted in the in-vehicle user interface 330.

Figure 4:
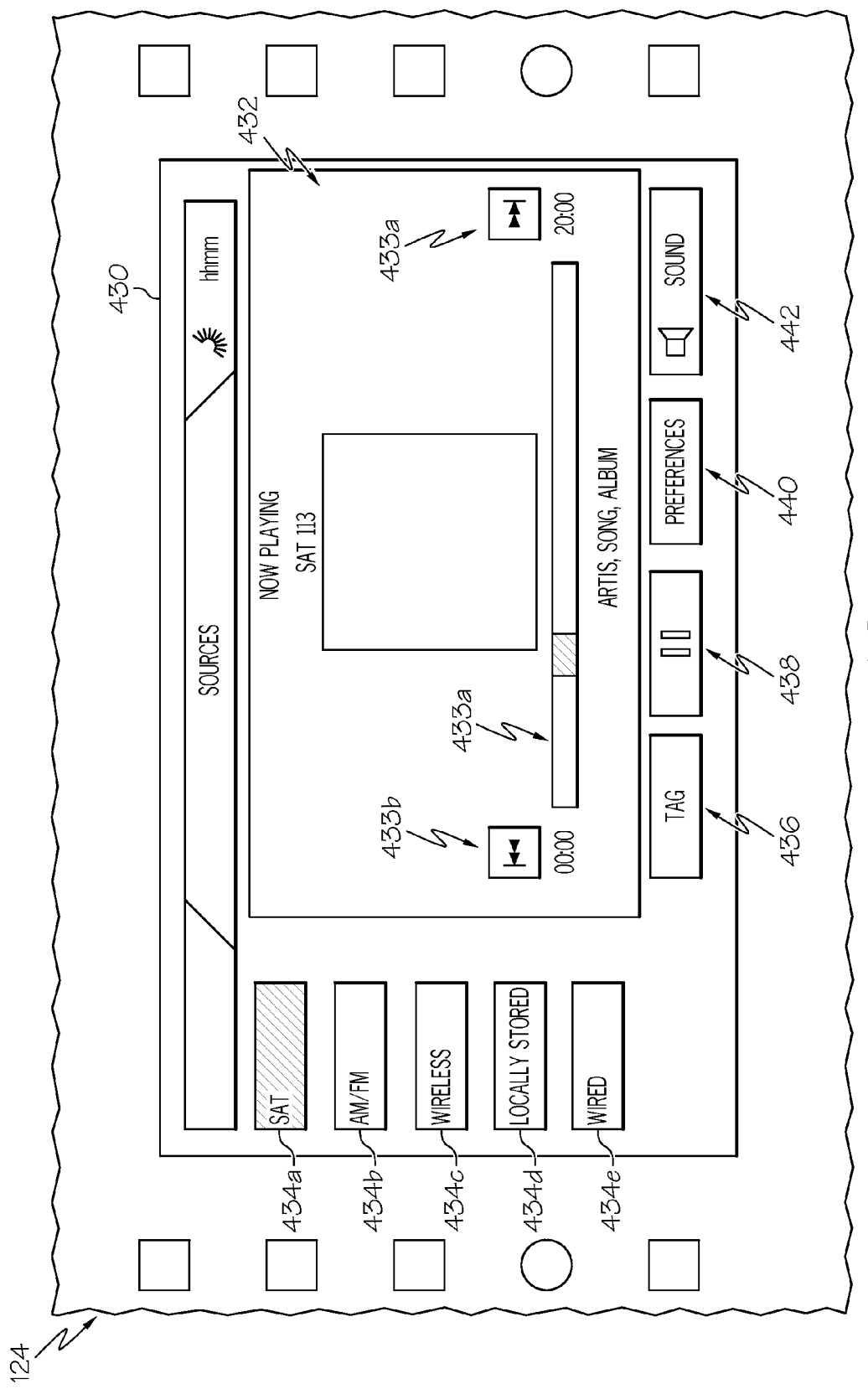
FIG. 4 depicts an in-vehicle user interface for providing additional audio sources to the user of the vehicle, according to embodiments disclosed herein.

FIG. 4 depicts an in-vehicle user interface 430 for providing additional audio sources to the user of the vehicle 102, according to embodiments disclosed herein. In response to selection of the source option 344 from FIG. 3, the in-vehicle user interface 430 may be provided. The in-vehicle user interface 430 includes a currently playing section 432, similar to depicted in the in-vehicle user interface 330 of FIG. 3. However, in response to selection of the source option 344 (FIG. 3), a source section 434 may be provided, which includes a satellite option 434a, a terrestrial option 434b, a wireless option 434c, a locally stored media option 434d, and a wired option 434e.

The satellite option 434a may provide various options for providing satellite media, as shown in FIG. 4. Similarly, in response to selection of the terrestrial option 434b, various options may be provided for receiving terrestrial radio content. In response to selection of the wireless option 434c, options for providing data from a wireless device (such as the mobile device 166) may be provided. In response of selection of the locally stored media option 434d, various options for providing locally stored media files may be provided. In response to section of the wired option 434e, various options for providing data from a wired device (such as the mobile device 166) may be provided. The wired option 434e may be provided for accessing media from the mobile device 166 through a wired connection, such as universal serial bus (USB) and the like.

Depending on the particular embodiment, the wireless option 434c and/or the wired option 434e may be unselectable and/or not provided in instances where the vehicle computing device 114 does not detect the mobile device 166 as communicating with the vehicle computing device 114. Specifically, if the mobile device 166 is not within range of the communication transceiver 152, the wireless option 434c may not be available. Similarly, if the mobile device 166 is not physically coupled to the vehicle computing device 114 through a wired connection, the wired option 434e may not be available.

Also included in the in-vehicle user interface 430 are a progress option 433a, reverse option 433b, a forward option 333c, a tag option 436, a pause option 438, a preferences option 440, and a sound option 442. These options may function similar to the options 333-342 depicted in FIG. 3.

Figure 5:
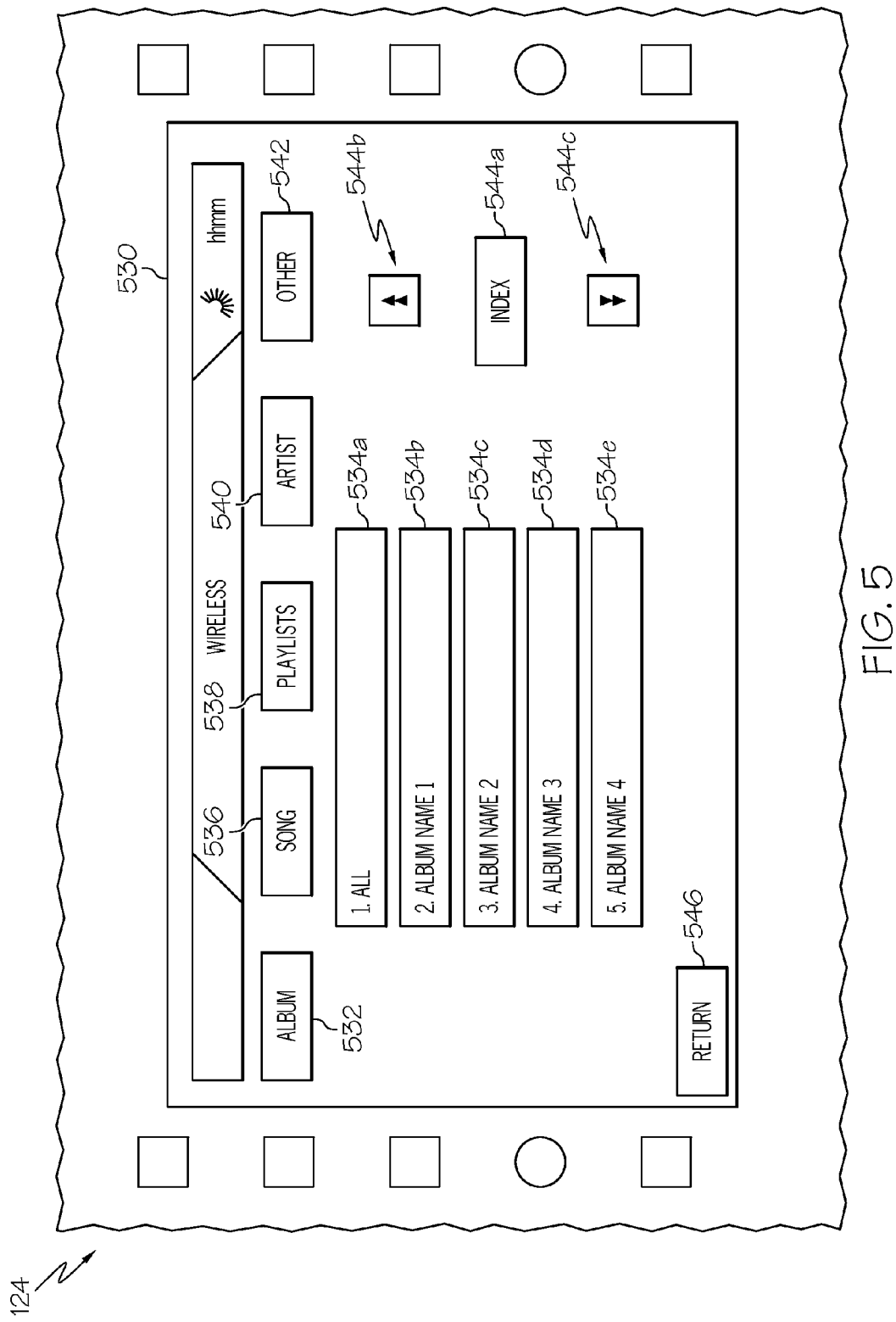
FIG. 5 depicts an in-vehicle user interface for providing detected media index of content from a mobile device, according to embodiments disclosed herein.

FIG. 5 depicts an in-vehicle user interface 530 for providing detected media index of content from a mobile device 166, according to embodiments disclosed herein. In response to selection of the wireless option 434c from FIG. 4, the in-vehicle user interface 530 may be provided. Specifically, upon detecting a previously registered mobile device, the vehicle computing device 114 may provide the media from the mobile device 166, as organized in the mobile device 166. Accordingly, in response to selection of an album option 532, one or more album names 534a-534e may be provided in the in-vehicle user interface 530. In some embodiments, the albums may be provided according to the hierarchy depicted in FIG. 2, such that the user may navigate the vehicle computing device 114 as they would navigate the mobile device 166. Accordingly, selection of an album in the in-vehicle user interface 530 may direct the user to songs of that album, as organized in the mobile device 166.

Also included are a song option 536, a playlists option 538, an artist option 540, an "other option" 542, and an index option 544. In response to selection of the song option 536, the user may be provided with a listing of songs that are located on the mobile device 166. Depending on the configuration of the mobile device 166, the songs provided from the song option 536 may be configured according to a hierarchy. The hierarchy may be organized according to song name, date, artist, and/or other criteria. Regardless, in some embodiments, the in-vehicle user interface 530 may provide the hierarchy as would be provided by the mobile device 166.

Similarly, in response to selection of the playlists option 538, playlists from the mobile device 166 may be provided. In response to selection of the artist option 540, media may be provided according to the corresponding artists. In response to selection of the other option 542, the media may be provided according to another predetermined organization.

It should be understood that, similar to the album names 534a-534e, the options 532, 536, 538, 540, and 542 may be provided, based on the organization of files on the mobile device 166. Specifically, the in-vehicle user interface 530 may mirror or substantially mirror the functional aspects of the mobile device 166 to provide a seamless experience for the user. Accordingly, if the mobile device 166 only provides categories for albums, songs, and artists, then only those options will be provided in the in-vehicle user interface 530. If additional options are provided on the mobile device 166, those options will also be provided in the in-vehicle user interface 530.

Also included are an index option 544a, scroll options 544b and 544c, and a return option 546. Selection of the index option 544a may navigate the user to the in-vehicle user interface 630 of FIG. 6. Selection of the scroll options may provide a view of other media in the in-vehicle user interface 530. Selection of the return option may return the user to the in-vehicle user interface 330 from FIG. 3.

Figure 6:
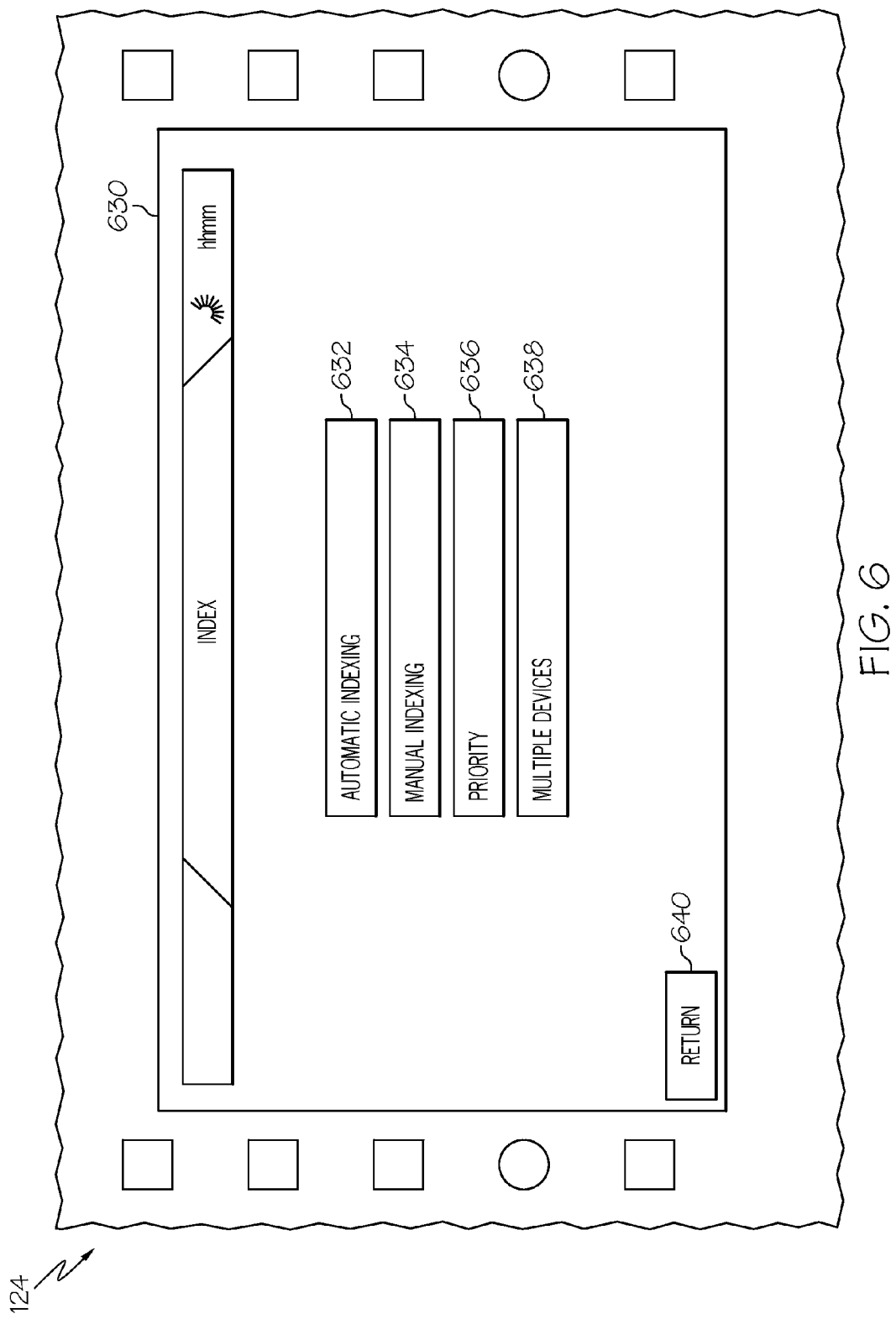
FIG. 6 depicts an in-vehicle user interface for providing indexing options for content on a mobile device, according to embodiments disclosed herein.

FIG. 6 depicts an in-vehicle user interface 630 for providing indexing options for content on a mobile device 166, according to embodiments disclosed herein. In response to selection of the index option 544a from FIG. 5, the in-vehicle user interface 630 may be provided. Similarly, upon detecting an unregistered mobile device, the in-vehicle user interface 630 may be provided. Regardless, the in-vehicle user interface 630 may include indexing options, such as an automatic indexing option 632, a manual indexing option 634, a priority option 636, and a multiple devices option 638. In response to selection of the automatic indexing option 632, the vehicle computing device 114 may automatically index media stored on the mobile device 166.

Depending on the particular embodiment, indexing may occur in response to detecting the mobile device 166 is in proximity of the vehicle 102, in response to receiving a signal from the mobile device 166 indicating a change in the index, and/or via other triggering mechanisms. As an example, once the files from the mobile device 166 have been indexed, the vehicle computing device 114 may send a signal and/or file to the mobile device 166 indicating that the mobile device 166 has been indexed. Then the mobile device 166 is again detected by the vehicle computing device 116, a determination may be made regarding whether the indexing has changed from the previous index. If so, the mobile device 166 may be again indexed and/or the current index may be amended with the updates.

Similarly, if the manual indexing option 634 is selected, the mobile device 166 may only be indexed upon a predetermined user action. In response to selection of the priority option 636 priority preferences may be set. If the vehicle computing device 114 detects a plurality of mobile devices 166, the vehicle computing device 114 may determine which mobile device 166 to retrieve content. As an example, if John and Jane are married and Jane primarily drives the vehicle 102, Jane's mobile device 166 may have priority over any other device detected by the vehicle computing device 114. However, if John is driving the vehicle 102, his mobile device 166 may have priority over any other mobile device (other than Jane's). Additionally, if content is being received from a user computing device or other remote source, priority may be assigned to that device as well.

Similarly, the multiple devices option 638 may provide options for the user to determine a policy for handling the indexing and utilization of content from a plurality of mobile devices 166. Referring to the example above, if the multiple devices option 638 is selected, and both John and Jane enter the vehicle 102 with their respective mobile devices 166, the vehicle computing device 114 may index and/or retrieve content from both devices, such that both libraries are available. Similarly, if the vehicle computing device 114 is configured for accessing remotely stored content, such as from the user computing device or elsewhere, these libraries may also be provided. In such embodiments where another different mobile device 166 is detected, the vehicle computing device 114 may provide an in-vehicle user interface, as described above for the mobile device 166 and another in-vehicle user interface for the other mobile device. In response to selection of a return option 546, the user may be navigated back to the in-vehicle user interface 330 from FIG. 3.

Figure 7:
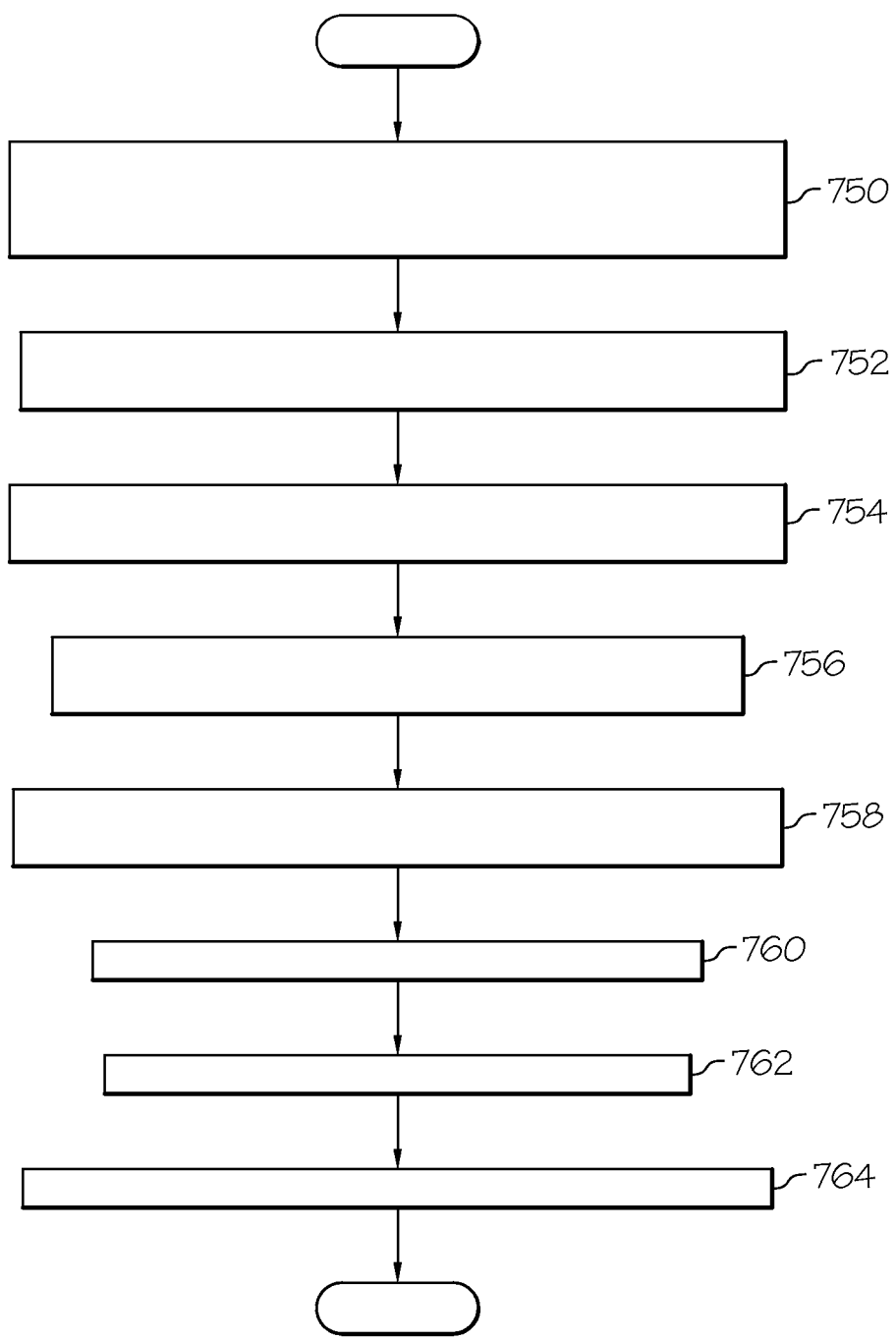
FIG. 7 depicts a flowchart for providing vehicle browsing of a mobile device, according to embodiments disclosed herein.

FIG. 7 depicts a flowchart for providing vehicle browsing of a mobile device 166, according to embodiments disclosed herein. As illustrated in block 750, the vehicle computing device 114 may be linked with the mobile device 166. The mobile device 166 may store a plurality of media files that are organized in a predetermined configuration. In block 752, a location of each of the plurality of media files may be determined, with regard to the predetermined configuration. In block 754, a first request for one of the plurality of media files may be received at the vehicle computing device 114. In block 756, a location of the requested media file may be determined in the predetermined configuration. In block 758, a control signal may be sent to navigate the mobile device 166 to the requested media file. In block 760, a second request to play the requested media file may be sent. In block 762, the requested media file may be received for playback. In block 764, the requested media file may be played through a vehicle audio system.

FIG. 8 depicts a network environment for vehicle 102 browsing of a mobile device 166, according to embodiments disclosed herein. The vehicle 102 is depicted in FIG. 8 as an automobile but may be any passenger or non-passenger vehicle such as, for example, a terrestrial, aquatic, and/or airborne vehicle. The vehicle 102 may be coupled to a remote computing device 804 and/or a user computing device 806 for receiving content and/or other data via a network 800. The network may include a wide area network, local area network, and/or other wired or wireless network for communicating data, as described herein.

Also illustrated is the vehicle computing device 114, which includes the processor 132, input/output hardware 808, the network interface hardware 850, a data storage component 836 (which stores routing data 838*a*, user data 838*b*, and/or other data), and the memory component 134. The memory component 134 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 114 and/or external to the vehicle computing device 114.

The memory component 134 may store operating logic 842, the indexing logic 144*a* and the communications logic 144*b*. The indexing logic 144*a* and the communications logic 144*b* may each include a plurality of different pieces of logic, each of which may be embodied as a computer program, firmware, and/or hardware, as an example. A local interface 834 is also included in FIG. 8 and may be implemented as a bus or other communication interface to facilitate communication among the components of the vehicle computing device 114.

The processor 132 may include any processing component operable to receive and execute instructions (such as from a data storage component 836 and/or the memory component 134). As described above, the input/output hardware 808 may include and/or be configured to interface with the components of FIG. 8. As an example, the input/output hardware 808 may include the microphones 120, the speakers 122, the display device 124, and/or other hardware in the vehicle 102.

The network interface hardware 850 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the vehicle computing device 114 and other computing devices.

The operating logic 842 may include an operating system and/or other software for managing components of the vehicle computing device 114. Similarly, as discussed above, the indexing logic 144*a* may reside in the memory component 134 and may be configured to cause the processor 132 to provide one or more of the user interfaces described herein. Similarly, the communications logic 144*b* may be utilized to determine the triggering action for implementing the functionality described herein.

It should be understood that while the components in FIG. 8 are illustrated as residing within the vehicle computing device 114, this is merely an example. In some embodiments, one or more of the components may reside external to the vehicle computing device 114. It should also be understood that, while the vehicle computing device 114 in FIG. 1 is illustrated as a single device, this is also merely an example. In some embodiments, the indexing logic 144*a* and the communications logic 144*b* may reside on different computing devices. As an example, one or more of the functionality and/or components described herein may be provided by a remote computing device 804 and/or user computing device 806, which may be coupled to the vehicle 102 via a network 800, which may be embodied as a wide area network and/or local area network.

Additionally, while the vehicle computing device 114 is illustrated with the indexing logic 144*a* and the communications logic 144*b* as separate logical components, this is also an example. In some embodiments, a single piece of logic may cause the vehicle computing device 114 to provide the described functionality.

As illustrated above, various embodiments of the system and method for browsing a mobile device 166 with an in-vehicle user interface provide the ability to navigate a mobile device 166 utilizing a vehicle interface. Specifically, some embodiments provide a graphical user interface for the vehicle user to navigate the mobile device 166. Similarly, some embodiments may link voice commands with the location of specific media files to provide an audio user interface for navigating the mobile device 166. Regardless, these embodiments provide increased functionality for controlling a mobile device 166.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A method for browsing a mobile device with an in-vehicle user interface, comprising:
    identifying the mobile device in proximity of a vehicle computing device;
    linking the vehicle computing device with the mobile device, wherein the mobile device is registered with the vehicle computing device and stores a plurality of media files that are organized according to a predetermined configuration, wherein the vehicle computing device is physically integrated into a vehicle;
    providing the in-vehicle user interface that functionally mirrors an interface of the mobile device and providing a location of each of the plurality of media files with regard to the predetermined configuration, wherein the interface of the mobile device includes an electronic program guide (EPG) with a plurality of options for accessing the plurality of media files via the mobile device;
    providing a manual indexing option for indexing the plurality of media files from the mobile device onto the vehicle computing device only in response to a user command to index the plurality of media files;
    in response to a selection of the manual indexing option and receiving the user command to index the plurality of media files, determining, by the vehicle computing device, the location of each of the plurality of media files with regard to the predetermined configuration to navigate the mobile device;
receiving a first request for a requested media file of the plurality of media files at the vehicle computing device;
determining a location of the requested media file in the predetermined configuration;
sending a control signal for the vehicle computing device to navigate the electronic program guide of the mobile device to the requested media file;
sending a second request to play the requested media file;
receiving the requested media file for playback; and
playing the requested media file through a vehicle audio system.

2. The method of claim 1, further comprising determining a unique identifier for each of the plurality of media files.

3. The method of claim 1, wherein determining a location of each of the plurality of media files comprises determining a navigation process for locating each of the plurality of media files on the mobile device.

4. The method of claim 1, wherein the plurality of media files includes at least two identical media files that are stored at different locations within the mobile device, the method further comprising:
determining which of the at least two identical media files is a more accessible media file; and
in response to receiving the request to play the requested media file, navigating the mobile device to the more accessible media file.

5. The method of claim 1, wherein the request to play the requested media file includes a voice command from a user.

6. The method of claim 1, further comprising providing an in-vehicle user interface that functionally mirrors a user interface provided by the mobile device.

7. The method of claim 6, further comprising detecting an different mobile device and provide another in-vehicle user interface that functionally mirrors a mobile user interface provided by the different mobile device.

8. A system for browsing a mobile device with an in-vehicle user interface, comprising:
a hardware processor; and
a hardware memory component that is coupled to the hardware processor and stores logic that, when executed by the processor, causes the system to perform at least the following:
identify the mobile device in proximity of a vehicle computing device;
link the vehicle computing device with the mobile device, wherein the mobile device is registered with the vehicle computing device and stores a plurality of media files that are organized according to a predetermined configuration and wherein the vehicle computing device is physically integrated with a vehicle;
provide an in-vehicle user interface that functionally mirrors an interface of the mobile device and provides the location of each of the plurality of media files with regard to the predetermined configuration, wherein the interface of the mobile device includes an electronic program guide (EPG) with a plurality of options for accessing the plurality of media files via the mobile device;
provide a multiple devices option for a user to select to determine a policy for handling indexing and utilization of content from the mobile device and another mobile device in communicative range with the vehicle computing device;
receiving the user command to index the plurality of media files, determining, by the vehicle computing device, the location of each of the plurality of media files with regard to the predetermined configuration to navigate the mobile device;
receive a first request for a requested media file of the plurality of media files at the vehicle computing device;
determine a location of the requested media file in the predetermined configuration;
send a control signal to navigate the EPG of the mobile device to the requested media file;
send a second request to play the requested media file;
receive the requested media file for playback; and
play the requested media file through a vehicle audio system.

9. The system of claim 8, wherein the logic further causes the system to determine a unique identifier for each of the plurality of media files.

10. The system of claim 8, wherein determining the location of each of the plurality of media files comprises determining a navigation process for locating each of the plurality of media files on the mobile device.

11. The system of claim 8, wherein the plurality of media files includes at least two identical media files that are stored at different locations within the mobile device, and wherein the logic further causes the system to determine which of the at least two identical media files is a more accessible media file and, in response to receiving the request to play the requested media file, navigating the mobile device to the more accessible media file.

12. The system of claim 8, wherein the request to play the requested media file includes a voice command from a user.

13. The system of claim 8, wherein the logic further causes the system to determine a priority if the other mobile device is detected in proximity of the vehicle computing device.

14. The system of claim 8, wherein the logic further causes the system to detect an different mobile device and provide another in-vehicle user interface that functionally mirrors user interfaces provided by the different mobile device.

15. A vehicle for browsing a mobile device with an in-vehicle user interface, comprising:
a vehicle audio system; and
a vehicle computing device that is physically integral to the vehicle and stores logic that, when executed by the vehicle computing device, causes the vehicle computing device to perform at least the following:
identify the mobile device in proximity of a vehicle computing device;
link the vehicle computing device with the mobile device, wherein an interface of the mobile device includes an electronic program guide (EPG) with a plurality of options for accessing the plurality of media files via the mobile device;
provide an automatic indexing option for the vehicle computing device to automatically index a plurality of media files from the mobile device onto the vehicle computing device upon a determination of a change in the plurality of media files;
in response to a selection of the automatic indexing option and receiving the user command to index the plurality of media files and a determination that the media files from the mobile device have changed, determine a location of each of a plurality of media files on the mobile device, wherein the plurality of media files are organized according to a predetermined configuration to navigate the mobile device, wherein the plurality of media files comprises at least two identical media files at different locations in the predetermined configuration and wherein the mobile device is registered with the vehicle computing device;

provide a vehicle electronic program guide (EPG) that functionally mirrors at least a portion of a mobile EPG provided by the mobile device;

receive a request for a requested media file of the plurality of media files at the vehicle computing device;

determine which of the at least two identical media files is more accessible;

navigate, by the vehicle computing device, the mobile EPG to one of the at least two identical media files that is more accessible; and play the requested media file through the vehicle audio system.

16. The vehicle of claim 15, wherein the logic further causes the vehicle computing device to determine a unique identifier for each of the plurality of media files.

17. The vehicle of claim 15, wherein determining the location of each of the plurality of media files comprises determining a navigation process for locating each of the plurality of media files on the mobile device.

18. The vehicle of claim 15, wherein the request to play the requested media file comprises a voice command from a user.

19. The vehicle of claim 15, wherein the logic further causes the vehicle computing device to provide an in-vehicle user interface that functionally mirrors a user interface provided by the mobile device.

20. The vehicle of claim 19, wherein the logic further causes the vehicle computing device to detect an different mobile device and provide another in-vehicle user interface that functionally mirrors a mobile user interface provided by the different mobile device.

* * * * *